Dec. 22, 1964 R. W. SCHMIDT 3,162,258
METHOD AND APPARATUS FOR ACCURATELY
FILLING LIQUID CONTAINERS
Filed Nov. 13, 1962

INVENTOR.
Robert W. Schmidt,
BY Parker & Carter
Attorneys.

United States Patent Office 3,162,258
Patented Dec. 22, 1964

3,162,258
METHOD AND APPARATUS FOR ACCURATELY FILLING LIQUID CONTAINERS
Robert W. Schmidt, La Grange, Ill., assignor to Imac Corporation, Oak Lawn, Ill., a corporation of Illinois
Filed Nov. 13, 1962, Ser. No. 236,947
10 Claims. (Cl. 177—1)

This invention relates to a method and apparatus for accurately filling liquid containers.

A primary purpose of the invention is an assembly line method of the type described in which containers may be filled with a precisely regulated weight of a fluid substance.

Another purpose is an apparatus for weighing partially filled moving containers and for then adding an amount of a fluid to each partially filled container to bring it up to a predetermined weight.

Another purpose is an assembly line method and apparatus of the type described which may be used in filling containers at a very rapid rate, for example as high as 300 containers per minute.

Another purpose is a method of the type described in which the additional amount of fluid to complete filling of the container is added after completion of the weighing step.

Another purpose is a method of the type described in which the fluid for filling each container is drawn from a reservoir during the weighing operation.

Another purpose is a weighing apparatus for use in classifying objects by weight.

Other purposes will appear in the ensuing specification, drawings and claims.

Figure 1:
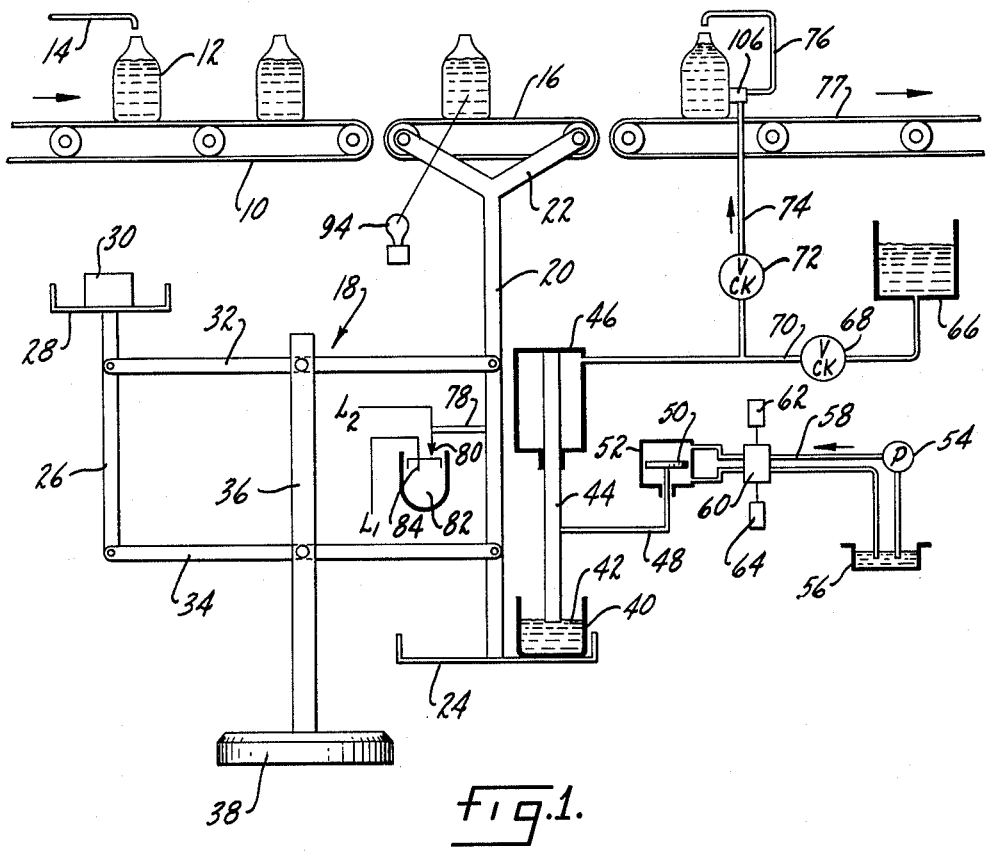
Figure 2:
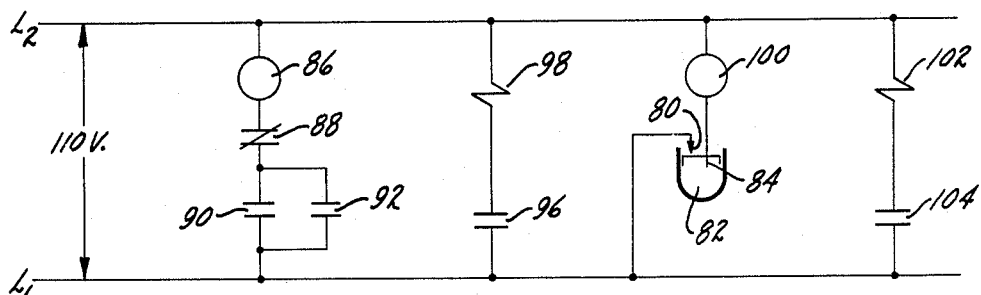

The invention is illustrated diagrammatically in the following drawings wherein:

FIGURE 1 is a diagrammatic illustration of an apparatus of the type described which can practice the method disclosed, and FIGURE 2 is an electrical wiring diagram for use in the apparatus illustrated in FIGURE 1.

The present method and apparatus is particularly directed to filling containers with a fluid, for example bonded whiskey, or other expensive fluids, for example cosmetics, in which the bottler can lose substantial sums of money if there is a recurring overage in the containers being filled. Particularly in the field of bonded whiskey, in which the distiller pays a government tax on the total amount of whiskey in the container, the distiller stands to lose a substantial amount of money if he cannot accurately fill his bottles. Considering that bonded whiskey may be bottled at the rate of approximately 300 bottles per minute, even an overage as small as a quarter ounce in each bottle can run into substantial sums of money over a peroid of time. The same is true when containers are to be filled with expensive cosmetics or the like in which the containers are rapidly filled on an assembly line. The present invention has application to any type of fluid substance, regardless of its viscosity, in which it is desirable to place a precisely controlled weight of this fluid into a container.

Considering FIGURE 1, a conveyor 10 may move a plurality of containers 12 underneath a filling spout 14. The filling spout 14 is so regulated, by a device not shown and not important to an understanding of the invention, that the containers are only partially filled. Each container will be filled to a level near the final level, but short of it.

From the conveyor 10 the containers 12 move to a second conveyor 16 which is supported by a scale or weighing apparatus indicated generally at 18. Although not shown, the conveyor 16 may have restraint on its vertical movement. The conveyor 16 may be supported on a vertically extending arm 20 with a yoke 22 at its upper end. The bottom of the arm 20 is fixed to a tray or the like 24. The arm 20 is part of the scale 18 which is a parallelogram type of scale. An arm 26, at the opposite side of the scale, mounts a tray 28 which contains a weight 30. In the alternative the scale may be spring loaded to the up position. The weight 30 is generally fixed, but may be varied in small amounts and is used to keep the conveyor 16 in the up position of FIGURE 1 when no weighing is being performed. The arms 20 and 26 are held together by pivotal crossbars 32 and 34, the crossbars being pivoted to the arms 20 and 26 and to a center support 36. A suitable base or the like 38 mounts the center support 36.

Mounted on the tray 24 is a vessel 40 containing a fluid 42 which may have the same specific gravity as the fluid being placed in the bottles or containers 12 or it may have a different specific gravity. A displacer piston 44 is positioned above the vessel 40 and in the inoperative position of FIGURE 1, the lower end of the displacer piston is just within the fluid 42. The displacer piston extends upwardly into a cylinder 46.

Fixed to the piston 44 is an arm 48 which is attached to a piston 50 movable within a cylinder 52. The piston 50 may be reciprocated within the cylinder 52 by means of a suitable pump 54 which will draw a suitable fluid, hydraulic, air or otherwise, from a reservoir 56, through a line 58, past a valve 60 and into the cylinder 52. The valve 60 is controlled by two solenoids 62 and 64. When solenoid 62 is operated, the valve 60 will operate in such a manner that piston 50 will move downward and will move the displacer piston 44 downwardly with it into the liquid 42. When solenoid 64 is operated, piston 50 will move in the oppostie direction, or upwardly, and will move the displacer piston 44 in an upward direction. This is a conventional three position valve arrangement and no fluid flows when both solenoids are inoperative.

A reservoir 66, which contains the same fluid as is being used in filling the containers 12 is connected by a check valve 68 and line 70 to the upper end of cylinder 46. When the displacer piston 44 is moved downward, by the piston 50 as described above, fluid will be drawn through the check valve 68 and into line 70. Some of the fluid may reach cylinder 46. The check valve 68 will permit fluid to be drawn in this direction but will not permit the fluid to move back to reservoir 66.

A check valve 72 is positioned in line 74 which connects to line 70 at its lower end and to a filling device indicated diagrammatically at 76 at its upper end. The check valve 72 will permit fluid to flow in an upward direction, but not in a downward direction. When piston 50 and the displacer piston 44 move upward, the fluid in line 70 and cylinder 46 drawn from the reservoir 66 will be rapidly forced upward through line 74, past check valve 72, into the filling device 76, and into the container positioned on conveyor 77 and underneath the filling device.

Attached to arm 20 is an outwardly extending support arm 78 mounting an electrical contact 80 which is connected to L2, one of the conventional electric power lines feeding the system. The contact 80 is normally positioned above a pool of mercury 82 so that there is no contact between L2 and L1. When arm 20 has moved downward to a position such that contact 80 is in contact with the pool of mercury 82, a circuit will be completed from L2, through contact 80, the mercury 82, contact 84 to L1.

FIGURE 2 is an electrical diagram for the apparatus described above. Relay coil 86 is in series with a pair of normally closed contacts 88 and a pair of normally open contacts 90, the contacts 90 being in parallel with a pair of normally open contacts 92. Normally open contacts 90 will be closed as soon as a container moves onto the conveyor 16. The contacts will be closed by a suitable photoelectric device diagrammatically indicated at 94 in FIGURE 1. The bottle moving onto the conveyor will block a light beam and disrupt an electric current to cause the contacts 90 to momentarily close. In the alternative, means for synchronizing the arrival of a container and the start of the weighing step can be arranged. Contacts 92 are operated by coil 86 and as soon as the contacts 90 are momentarily closed, contacts 92 will be held closed by current flowing through coil 86.

Also operated by coil 86 are normally open contacts 96, which are in series with coil 98 which operates solenoid 62. Terminals 80 and 84 and the pool of mercury 82 are in series with a relay coil 100 which operates contacts 88. Contacts 88 are normally closed, however when the series circuit through the mercury is completed, these contacts will be opened to deactivate coil 86 and open contacts 96. In series with solenoid coil 102 which operates solenoid 64 are a pair of normally open contacts 104. The contacts 104, which are limit switch contacts, may be closed by the container moving underneath the filling apparatus 76. The limit switch is indicated at 106 in FIGURE 1.

The use, operation and function of the invention are as follows:

The present practice in bottling bonded whiskey, as an example, is to add liquid until a predetermined weight has been reached. This practice does not account for the amount of liquid in the air between the filling nozzle and the bottle. Accordingly, all of the bottles will have an overage and this overage costs bottlers a substantial sum of money. The present invention proposes to first weigh the underfilled container and then add the amount of liquid determined to be necessary to precisely bring the bottle up to a predetermined weight.

The containers are first filled to an amount less than that determined to be satisfactory for a full bottle. This deficiency must be less than the full stroke displacement of the piston 44. The containers then move onto a small conveyor which is part of the weighing device. As soon as the containers move onto the conveyor 16, normally open contacts 90 will be momentarily closed which will permit coil 86 to operate and close contacts 92. This locks in relay coil 86. Also operated by relay coil 86 are contacts 96 which then close the circuit through solenoid coil 98. This will permit solenoid 62 to operate the valve 60 in such a manner that piston 50 will move downwardly. As piston 50 moves downward, the displacer 44 will be moved deeper into the liquid 42. The amount of liquid displaced by the inserted end of the displacer piston 44 will be added to the weight of the container on the conveyor 16. Preferably the viscosity and specific gravity of the liquid in the vessel 40 is the same as that used to fill the containers 12. However, this is not necessary and the viscosities and specific gravities are different, then the diameter of the displacer piston 44 will be varied to accommodate this difference. The displacer 44 may have one diameter in cylinder 46 and another diameter where it enters vessel 40 to allow the fluid 42 to be of a favorable viscosity for non-adherence to the displacer and for pumping a viscous fluid of a different specific gravity from the reservoir. In any event, the amount of liquid displaced by the displacer 44 will be added to the weight of the container on the conveyor. As the scale moves downward, due to the added weight of the liquid displaced by the piston 44, it will close a circuit through the pool of mercury 82 when the total weight of the container, the amount of liquid therein, and the amount of liquid added by the displacer piston 44 equal a predetermined weight which is precisely the weight necessary to properly fill the bottle. When the circuit through the pool of mercury is closed, relay coil 100 will be operated and normally closed contacts 88 will be opened, stopping further downward movement of the piston 50.

During the time that the displacer piston 44 is being moved downwardly by piston 50 and weight is being added to the weight of the liquid and container on the scale, a suction is being created in cylinder 46 by downward movement of displacer piston 44. This suction permits fluid to be drawn from reservoir 66, past check valve 68 into line 70 and into the cylinder 46. The liquid or substance in the reservoir 66 is of course the same as that used to fill the containers. The weight of liquid that is withdrawn from the reservoir 66 is the same as that used to fill the container up to a predetermined weight. The volume of liquid displaced by the displacer piston 44 in moving downwardly into the liquid 42 will be the same as the volume of liquid drawn from the reservoir 66 by the vacuum created in the cylinder 46.

During the weighing process the containers are continually moving and normally this apparatus will be used in a filling system in which upwards of 300 bottles are filled per minute. The container 12 may have moved off the conveyor just after the weighing step is completed. The container will contact limit switch 106 and close its contacts 104. When the contacts 104 are closed current will flow through solenoid coil 102 and activate solenoid 64. Solenoid 64 is effective to position valve 60 to rapidly drive piston 50 in an upward direction. This drives the displacer piston 44 rapidly upward which forces the liquid within the cylinder 46, previously drawn from the reservoir 66, up through line 74, past check valve 72, and into the filling apparatus 76 and then into the container at the filling station. In the alternative, the filling station may be on the end of the weighting conveyor. What is important is that the weighing step be completed before the filling step is started.

Although the invention has generally been described in connection with filling bottles of bonded whiskey, it should be obvious that the invention should not be so limited. It may be utilized in filling any container with a fluid substance, regardless of the viscosity of the fluid. The fluid must have a low enough viscosity however so that it can be drawn from a reservoir 66 by the suction created in cylinder 46 and so that it can be rapidly driven through line 74 and into the filling apparatus.

The invention should not be limited to the mercury pool arrangement for detecting the point at which the scale is in balance. Other detection circuits may be equally satisfactory, for example a lineal variable differential transformer or a variable capacitance system.

The weighing apparatus shown may have utility in classifying objects by weight. A pulse generator or the like may be mounted on the displacer and arranged to provide digital data on the deviation of the weight on the conveyor from a standard.

Whereas the preferred form of the invention has been shown and described herein, it should be realized that there are many modifications, substitutions and alterations thereto within the scope of the following claims.

I claim:

1. An assembly line method of filling a series of moving containers with a predetermined weight of a fluid, including the steps of filling each container with an amount of said fluid less than said predetermined weight, weighing each container and the fluid therein to determine the weight of fluid that must be added to reach said predetermined weight, simultaneously drawing the weight of fluid necessary to bring said container up to said predetermined weight from a reservoir, and, after completion of the weighing step, directing the fluid drawn from the reservoir into the container.

2. The method of claim 1 further characterized in that said weighing step includes continually adding a volume of a fluid to the weight of the container and fluid therein until said predetermined weight is reached.

3. The method of claim 2 further characterized in that the fluid added to the weight of the container has the same viscosity as the fluid in the container.

4. The mehod of claim 2 further characterized in that the amount of fluid drawn from the reservoir is directly related to the volume of fluid added to the weight of the container and fluid.

5. The method of claim 4 further characterized in that the amount of fluid drawn from the reservoir equals the weight of fluid added to the weight of the container and fluid.

6. In an assembly line apparatus for filling a series of moving containers with a predetermined amount of a fluid, means for adding an amount of said fluid to partially filled containers to bring their volume up to a predetermined amount, including means for moving said containers, means for weighing each partially filled container as it is moved, a reservoir of said fluid, means, cooperating with the weighing means, for simultaneously drawing an amount of fluid from the reservoir sufficient to bring the amount of fluid in the container weighed up to said predetermined amount, and means for directing the fluid drawn from the reservoir into the container weighed after completion of the weighing step.

7. The structure of claim 6 further characterized in that the means for drawing fluid from the reservoir is operated by and with said weighing means.

8. The structure of claim 6 further characterized in that said weighing means includes a scale and a conveyor fixed to the scale.

9. The structure of claim 6 further characterized in that said weighing means includes a scale, means on the scale for supporting the container being weighed, and means for continually adding weight to the scale until a predetermined weight has been reached, said last named means being effective to continually draw fluid from said reservoir as weight is added to said scale.

10. The structure of claim 9 further characterized in that the weight added to the scale is in the form of a fluid, with the weight of fluid added being equal to the weight of fluid drawn from the reservoir.

References Cited in the file of this patent
UNITED STATES PATENTS

| | | |
|---|---|---|
| 1,069,449 | Manby et al. | Aug. 5, 1913 |
| 2,102,317 | Gwinn | Dec. 14, 1937 |
| 2,901,209 | Bardy et al. | Aug. 25, 1959 |